(12) United States Patent
Niemela et al.

(10) Patent No.: US 9,602,499 B2
(45) Date of Patent: Mar. 21, 2017

(54) AUTHENTICATING A NODE IN A COMMUNICATION NETWORK

(71) Applicant: F-Secure Corporation, Helsinki (FI)

(72) Inventors: Jarno Niemela, Sundsberg (FI); Pirkka Palomaki, Saratoga, CA (US)

(73) Assignee: F-Secure Corporation, Helsinki (FI)

( * ) Notice: Subject to any disclaimer, the term of this patent is extended or adjusted under 35 U.S.C. 154(b) by 0 days.

(21) Appl. No.: 14/259,445

(22) Filed: Apr. 23, 2014

(65) Prior Publication Data

US 2014/0237582 A1    Aug. 21, 2014

Related U.S. Application Data

(63) Continuation-in-part of application No. 13/259,479, filed as application No. PCT/EP2010/054571 on Apr. 7, 2010.

(30) Foreign Application Priority Data

Apr. 7, 2009 (GB) .................................. 0906002.1

(51) Int. Cl.
| | |
|---|---|
| H04L 29/06 | (2006.01) |
| G06F 21/30 | (2013.01) |
| G06F 21/33 | (2013.01) |
| G06F 21/44 | (2013.01) |
| H04L 9/32 | (2006.01) |

(52) U.S. Cl.
CPC ........ H04L 63/0823 (2013.01); H04L 9/3263 (2013.01); H04L 9/3268 (2013.01); H04L 63/1441 (2013.01); H04L 63/1466 (2013.01)

(58) Field of Classification Search
CPC    H04L 63/0823; H04L 63/1466; H04L 9/3263
USPC .......................................................... 726/10
See application file for complete search history.

(56) References Cited

U.S. PATENT DOCUMENTS

| | | | |
|---|---|---|---|
| 6,611,869 B1 * | 8/2003 | Eschelbeck | H04L 41/0213 707/999.009 |
| 6,820,063 B1 * | 11/2004 | England | G06F 21/10 705/50 |
| 7,107,449 B2 * | 9/2006 | Mont | G06Q 20/3821 705/76 |

(Continued)

FOREIGN PATENT DOCUMENTS

| | | |
|---|---|---|
| CN | 101136748 A | 3/2008 |
| CN | 101272616 A | 9/2008 |

(Continued)

*Primary Examiner* — Linglan Edwards
(74) *Attorney, Agent, or Firm* — Harrington & Smith

(57) ABSTRACT

A method and apparatus for authenticating a first node's identity in a communication network. An authentication node receives from a second node an authentication request. The authentication request includes a first certificate that has previously been presented to the second node by a node purporting to be the first node. The authentication node retrieves a second certificate belonging to the first node from the first node, and compares the first certificate with the second certificate. If the certificates match, then the first node's identity can be authenticated but if the certificates do not match, then the first node's identity cannot be authenticated. The results of the comparison are then sent to the second node.

16 Claims, 6 Drawing Sheets

(56) References Cited

U.S. PATENT DOCUMENTS

| | | | |
|---|---|---|---|
| 7,305,550 B2 * | 12/2007 | Oliver | G06F 21/32 380/247 |
| 7,310,732 B2 * | 12/2007 | Matsuyama | G06F 21/10 705/59 |
| 7,437,755 B2 * | 10/2008 | Farino | G07C 9/00103 726/12 |
| 7,500,100 B1 | 3/2009 | Kobozev et al. | 713/168 |
| 7,739,494 B1 | 6/2010 | McCorkendale | |
| 7,886,344 B2 | 2/2011 | Wei | |
| 8,327,131 B1 | 12/2012 | Hardjono | |
| 8,677,466 B1 * | 3/2014 | Chuang | H04L 9/321 709/229 |
| 2002/0026577 A1 * | 2/2002 | Futamura | H04L 9/3268 713/156 |
| 2002/0087858 A1 | 7/2002 | Oliver et al. | 713/156 |
| 2003/0097592 A1 | 5/2003 | Adusumilli | |
| 2003/0237004 A1 | 12/2003 | Okamura | 713/201 |
| 2005/0138351 A1 | 6/2005 | Lee et al. | 713/151 |
| 2005/0149723 A1 * | 7/2005 | Watkins | H04L 63/0823 713/156 |
| 2006/0048225 A1 | 3/2006 | Gomez | |
| 2006/0161975 A1 | 7/2006 | Diez et al. | 726/18 |
| 2007/0094716 A1 * | 4/2007 | Farino | G07C 9/00103 726/5 |
| 2008/0133907 A1 | 6/2008 | Parkinson | |
| 2008/0148045 A1 | 6/2008 | Shen | |
| 2009/0063855 A1 | 3/2009 | Parkinson | |
| 2010/0138907 A1 | 6/2010 | Grajek | |
| 2010/0146250 A1 | 6/2010 | Bergerson et al. | |
| 2010/0185849 A1 * | 7/2010 | Rune | G06F 21/445 713/156 |
| 2010/0325429 A1 | 12/2010 | Saha et al. | 713/158 |
| 2012/0054847 A1 | 3/2012 | Schultz et al. | |
| 2014/0095866 A1 * | 4/2014 | Grebennikov | H04L 9/3268 713/156 |

FOREIGN PATENT DOCUMENTS

| | | |
|---|---|---|
| EP | 2020798 A2 | 7/2008 |
| WO | WO 2004/114586 A1 | 12/2004 |

* cited by examiner

AUTHENTICATING A NODE IN A COMMUNICATION NETWORK

CROSS-REFERENCE TO A RELATED PATENT APPLICATION

This patent application is a continuation-in-part of U.S. patent application Ser. No. 13/259,479 filed Dec. 5, 2011, which claims priority from PCT Patent Application Ser. No. PCT/EP10/54571 filed Apr. 7, 2010 which claims priority from the GB Patent Application No. 0906002.1, filed Apr. 7, 2009, hereby incorporated by reference in their entireties.

FIELD OF THE INVENTION

The present invention relates to authenticating nodes in a communication network.

BACKGROUND TO THE INVENTION

Use of communications networks such as the Internet to access secure services such as customer bank account details is now commonplace. However, it is important for the user that this type of access cannot be compromised by a malicious third party.

Transport Layer Security (TLS) and its predecessor Secure Sockets Layer (SSL) are commonly used protocols to enable information to be sent securely over the communication network. These protocols rely on authentication of a certificate to allow each party to authenticate themselves to other parties. Certificates are provided by a Certifying Authority (CA).

Consider the situation in which a user client accesses a secure server to, for example, access a users bank account. When the user client accesses the server, the server presents its certificate to the user client. The user client validates the server's certificate. Note that if the user client is to be sure that the certificate comes from the same server, information identifying the server (such as a URL) should be included in the certificate. Only a trusted CA can include such information in the certificate, and so checking the information identifying the server against information identifying the server included in the certificate can be used by the client to identify that the certificate belongs to the server.

It is possible for a malicious third party to approach a CA claiming to represent someone else, and obtain a certificate. For example, a malicious third party in Brazil may approach a CA based in the UK, and claim to represent a Finnish bank. The malicious third party would present his own identifying information to be embedded in the certificate. The CA may not have the resources to perform comprehensive checks on the third party and simply issue a certificate on the basis of cursory checks. For example, the third party may obtain remote access to the Finnish bank's computer network and send an email to the CA that seems to come from an employee of the Finnish bank. There are several ways in which a malicious third party can trick a CA into issuing a certificate. The certificate obtained by the third party would therefore appear to be linked to the identification of a server of the Finnish bank when it in fact is linked to an identification of a server used by the third party.

Once a malicious third party has obtained a certificate, any communications between a client and the Finnish bank server become vulnerable to a so-called "man-in-the-middle" attack. In this type of attack, the malicious third party is an attacker and connects to both the client and to the server, as illustrated in FIG. 1. The attacker 1 impersonates the server 2 towards the client 3, and impersonates the client 3 towards the server 2, making the client 3 and sever 2 believe that they are communicating directly with one another. Even when the attacker 1 has obtained a certificate that incorporates identifying information the Server 2, the user's client 3 can be fooled into thinking that it is communicating with the Server 2 rather than the attacker 1.

Further problems may arise when a malicious third party is able to create server certificates that are issued by a root CA or its delegate CA. For example, the malicious third party end-point may perform a man-in-the-middle attack between an end-point and the CA.

Certificate pining is an emerging method to circumvent valid certificate based attacks. However, this is not effective if the first session is targeted with a man-in-the-middle attack. Also this does not provide more granular control to trust of certificates.

Revocation lists of revoked certificates can also be ineffective as they are usually not turned on, and would not help in the case of a valid certificate chain from a trusted root and the trusted root has not acknowledged the false certificate in its revocation list.

Using a centralized "many eyes" strategy where certificates are retrieved by several clients and compared at the backend server can be problematic, since an attacker may be able to prevent access to the central backend and thus users cannot distinguish between network or backend server error and the attacker manipulating the network traffic.

There remains a need for a certificate trustworthiness evaluation system that does not rely solely on central servers.

SUMMARY OF THE INVENTION

It is an object of the invention to reduce the risk of man-in-the-middle attacks, even in situations where a client node cannot connect to a central sever.

According to a first aspect of the invention, there is provided a method of determining a reputation score for a certificate in a communication network. According to the method, a client node receives the certificate from a remote node. The client node then compares data relating to the certificate with data stored in a certificates database stored at the client node. The client node then determines a reputation score for the certificate based on the comparison, the reputation score being usable for determining whether to trust the certificate. Advantageously, the method allows a client node to make a determination as to whether to trust a certificate, without having to contact a central server.

As an option, the method may further comprise the step of determining whether to terminate communication with the remote node based on the reputation score, or informing a user of the reputation score, such that the user can decide whether to terminate communication with the remote node.

Optionally, the certificate is stored in the database, along with further information about the certificate.

The further information may optionally comprise any one of; a date and/or time the certificate was generated; a date and/or time the certificate was received; an address of the remote node; and network information over which the certificate was received.

The comparison to determine the reputation score may optionally comprise any of: comparing the certificate against information contained in a Certifying Authority revocation list; comparing a reputation of the remote node against information contained in a reputation list; determining if the remote node already has an existing certificate, and comparing the existing certificate with the certificate; comparing the certificate received from the remote node when the client node uses a first network, against a further certificate received from the remote node when the client node uses a further network; and comparing the certificate received from the remote node against further certificates received from the remote node at different time periods or locations.

As an option, the network may be any one of a WiFi, 3G, or LTE network.

Optionally, the method further comprises downloading information relating to certificates from a server and storing the information relating to certificates in the database. The information relating to the certificate may have been gathered/generated by other client nodes before being uploaded to the server. The information may include a reputation score assigned to the certificate by each of the other client nodes.

Optionally, the method further comprises uploading information from the client node to the server, where the information relating to the certificate. For example, the client node may upload its calculated reputation score for the certificate to the server. This information can then be used by other entities, such as other client nodes.

According to a second aspect of the invention, there is provided a client node. The client node comprises; a first receiver arranged to receive a certificate from a remote node; a certificates database comprising data relating to certificates; and a first processor arranged to compare data relating to the certificate with the data in the certificates database. The first processor is further arranged to determine a reputation score for the certificate based on the comparison, the reputation score being usable for determining whether to trust the certificate.

As an option, the client node may further comprise a second processor arranged to determine whether to terminate the communication with the remote node based on the reputation score.

As a further option, the client node may further comprise an I/O interface, and the second processor may be further arranged to inform a user of the reputation score, such that the user can decide whether to terminate the communication with the remote node.

As a further option, the first processor may be arranged to store the certificate in the database, along with further information about the certificate.

Optionally, the first processor is arranged to compare any of: the certificate received from the remote node with information contained in a Certifying Authority revocation list; a reputation of the remote node against a reputation list stored in the database; an existing certificate for the remote node against the received certificate from the remote node; the certificate received from the remote node when the client node uses a first network, against a further certificate received from the remote node when the client node uses a further network; the certificate received from the remote node against further certificates received from the remote node at different time periods or locations.

The client node may further comprise a transmitter for transmitting a request to a server for further information regarding certificates, and a second receiver for receiving the further information regarding certificates.

According to a third aspect of the invention, there is provided a computer program, comprising computer readable code which, when run on a client node, causes the client node to behave as a client node as described in the second aspect.

According to a fourth aspect of the invention, there is provided a computer program product comprising a non-transitory computer readable medium and a computer program according to the third aspect, wherein the computer program is stored on the non-transitory computer readable medium.

There is provided a method of authenticating a first node's identity in a communication network. An authentication node receives from a second node an authentication request. The authentication request includes a first certificate that has previously been presented to the second node by a node purporting to be the first node. The authentication node retrieves a second certificate belonging to the first node by sending a request message to the first node and receiving a response from the first node that includes the second certificate belonging to the first node. A comparison is made between the first certificate and the second certificate. If the certificates match, then the first node's identity can be authenticated but if the certificates do not match, then the first node's identity cannot be authenticated. The results of the comparison are then sent to the second node.

The authentication node optionally stores information associated with the first certificate in the event that the certificates do no match. This can be used to further investigate man-in-the-middle attacks.

As an option, in the event that the received result of the comparison is that the first and second certificates do not match, the second node ceases any ongoing communication with the node purporting to be the first node.

As a further option, the authentication node retrieves a list of revoked certificates and compares the first certificate with certificates on the list of revoked certificates. If the first certificate matches a certificate on the list of revoked certificates, then the first node's identity is not authenticated.

As an option, the authentication node stores a record of queries from a plurality of remote nodes. The record includes certificates presented to each of the plurality of remote nodes by a node purporting to be the first node. After comparing the first certificate with the second certificate and determining that the certificates match, the authentication node compares the first certificate with certificates included in the record of queries and determines, on the basis of the comparison of the first certificate with certificates included in the record of queries, whether to authenticate the first node's identity. This ensures that the authentication node can take into account a possible DNS cache poisoning or other attack, or a change in the first node's certificate.

Optionally, in the event that the first certificate does not match at least some of the certificates included in the record of queries, first node's identity is not authenticated. Alternatively, in the event that the first certificate does not match at least some of the certificates included in the record of queries, the authentication node waits until a predetermined number of subsequent authentication requests relating to the first node have been received and compares the certificates included in the subsequent authentication requests with the first certificate. In the event that the certificates included in the subsequent authentication requests match the first certificate, the first node's identity can be authenticated, as it is likely that the difference between the first certificate and the certificates included in the record of queries is caused by the first node changing its certificate.

There is provided an authentication node for use in authenticating a first node's identity in a communication network. A first receiver is provided for receiving from a second node an authentication request, which includes a first certificate presented to the second node by a node purporting to be the first node. A transmitter is provided for sending to the first node a request message, and a second receiver is provided for receiving a response from the first node, the response including a second certificate belonging to the first node. A processor is also provided for comparing the first certificate with the second certificate and, in the event that the certificates match, authenticating the first node's identity and in the event that the certificates do not match, not authentication the first node's identity. In addition, a second transmitter is provided for sending the result of the comparison to the second node.

The authentication node optionally includes a memory for storing information associated with the first certificate in the event that the certificates do no match.

The memory is preferably arranged to store a record of queries from a plurality of remote nodes, the record including certificates presented to each of the plurality of remote nodes by a node purporting to be the first node. In this case, the processor is arranged to, after comparing the first certificate with the second certificate and determining that the certificates match, compare the first certificate with certificates included in the record of queries. The processor is further arranged to determine on the basis of the comparison of the first certificate with certificates included in the record of queries whether to authenticate the first node's identity.

There is provided a client device for use in a computer network. A first receiver is provided for receiving a certificate from a node purporting to be a first node. A first transmitter is provided for sending to an authentication server an authentication request, the authentication request including the certificate. A second receiver is arranged to receive from the authentication server an authentication result, the authentication result including an indication of whether the certificate is associated with the first node. A processor is provided for terminating communication with the node purporting to be the first node in the event that the authentication result includes an indication that the certificate is not associated with the first node.

There is provided a computer program, comprising computer readable code which, when run on an authentication node, causes the authentication node to behave as an authentication node as described above.

There is provided a computer program product comprising a computer readable medium and a computer program as described above in the fourth aspect of the invention, wherein the computer program is stored on the computer readable medium.

There is provided a computer program, comprising computer readable code which, when run on a client device, causes the client device to behave as a client device as described above.

There is provided a computer program product comprising a computer readable medium and a computer program, wherein the computer program is stored on the computer readable medium.

DETAILED DESCRIPTION OF CERTAIN EMBODIMENTS

The following description discusses the invention in the environment of Secure Sockets Layer (SSL) protocols used in the Internet, but it will be appreciated that it can apply equally to other types of security protocol that rely on certificates, and to other types of communication network.

Figure 1:
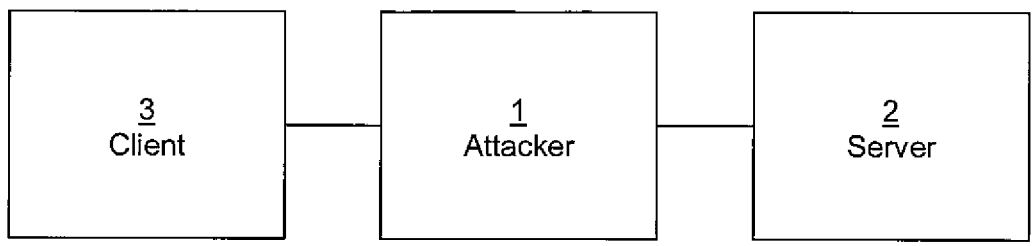
FIG. 1 illustrates schematically in a block diagram a man-in-the-middle attack between a client and a server.
Figure 2:
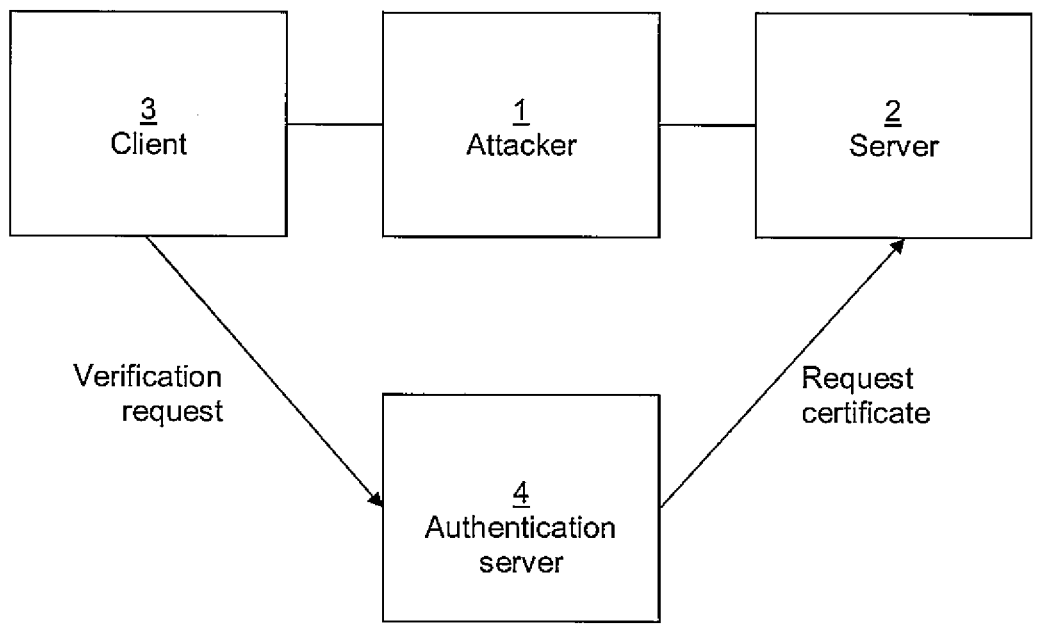
FIG. 2 illustrates schematically in a block diagram a network architecture and signalling.

Referring to FIG. 2, a third party authentication server 4 is provided that can connect to both the client 3 and the server 2. In this example, an attacker 1 uses Domain Name System (DNS) poisoning to provide false data to a Domain Name Server (not shown). The Domain Name Server caches information in order to improve its performance, and so will also cache the false information. In this case, the Domain Name Server has the server of the attacker's domain redirected to the server 2. In this way, anyone who uses the Domain Name Server to perform a DNS lookup for the server 2 will obtain the attacker's domain name rather than the servers 2 domain name.

The client 3 subsequently performs a DNS lookup in order to contact the server 2, and because the Domain Name Server has been poisoned, receives the attacker's 1 domain name. The client 3 then contacts the attacker 2 in the belief that he is contacting the server 2, and is unaware that he is really communicating with the attacker 1.

The SSL protocol is used for the client 3 to validate the servers 3 certificate. The attacker 1 sends the client 3 the attacker's certificate, and the client 3 checks the digital signatures of the attacker's certificate. Because the attacker's certificate was fraudulently obtained from a CA, the certificate is validated, and the client now believes that it can communicate securely with the server 2 when it is in fact communicating with the attacker 1.

According to the invention, out of band authentication is used to provide a further check on the certificate presented by the attacker. When the SSL connection is opened between the client 3 and the server 2, or the client 3 and the attacker, an authentication request is sent to the third party authentication server 4. The authentication request contains the servers 2 certificate.

When the authentication server 4 receives the authentication request, it contacts the server 2 to obtain the servers certificate. The server 2 replies to the authentication server 4 with its certificate. Note that the authentication server may already have knowledge of the servers certificate (for example, if it has been statically provisioned or provided to the authentication server 4 in a previous request). The authentication server 4 then compares the server certificate received from the client 3 in the authentication request with the server certificate received from the server 2. If there is no man-in-the-middle attack, and the client 3 is communicating directly with the server 2, then the certificates are identical and the authentication server 4 can report to the client 3 that the server 2 is authenticated and can be trusted. If, on the other hand, the certificates do not match, the authentication server 4 reports to the client 1 that the client 1 has been presented with a fraudulent certificate and the connection with the attacker 1 should be closed.

The authentication server 4 may also retrieve lists of revoked certificates from one or more CAs. The server certificate can be compared with entries in the revoked certificates list. If a match is found, then the authentication server 4 is aware that the servers certificate is revoked, and reports to the client 1 that the client has been presented with a revoked certificate.

The authentication server 4 can perform additional tasks, such as data mining, to look for patterns where certificates are presented by the same attacker 1. This data can be used for detecting any unusual activity that may be further researched by the operators of the authentication server 4 to predict new forms of misuse be they become common knowledge. Furthermore, the authentication server 4 can apply rules to determine circumstances in which it is more likely that a client 3 is subject to a man in the middle attack. For example, a company may have a server based in the UK, and has previously presented certificates identifying the UK server. If a certificate purporting to be from the company is presented by the client, and the certificate identifies a server in China, it is more likely that the client is subject to a man in the middle attack.

Figure 3:
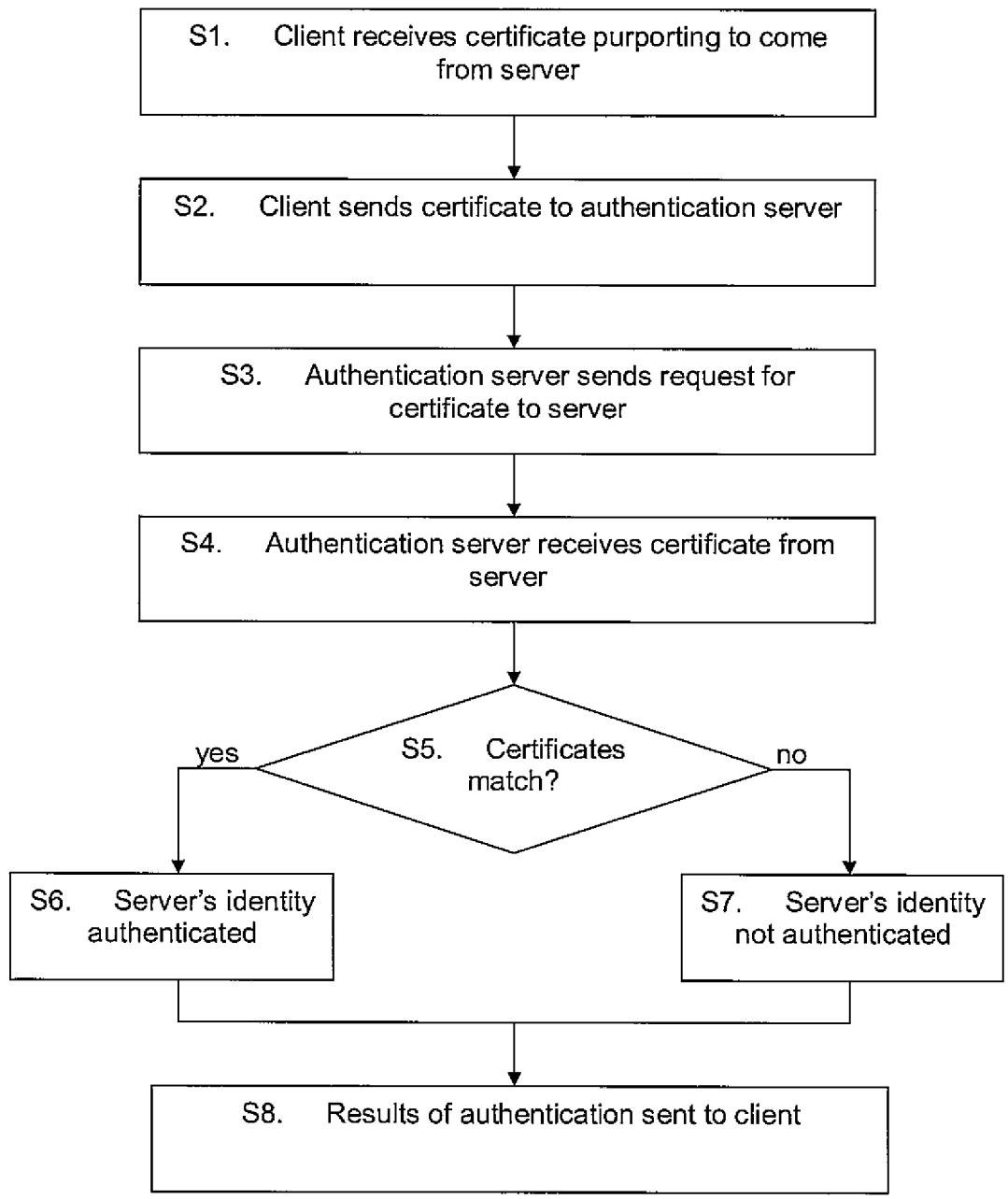
FIG. 3 is a flow diagram.

FIG. 3 is a flow diagram illustrating steps of the invention. The following numbering corresponds to the numbering of FIG. 3:

S1. The client 3 receives a certificate purporting to come from the server 2. As the certificate has been fraudulently obtained from a CA, initial SSL checks determine that the certificate can be trusted.

S2. The client 3 sends the certificate to the authentication server 4.

S3. The authentication server 4 sends a message to the server 2 requesting a copy of the servers certificate.

S4. The server 2 responds with a copy of its certificate.

S5. A comparison is made of the certificate received from the client 3 with the certificate received from the server 3.

S6. If the certificates match, then the certificate presented to the client 3 is valid and the servers 2 identity can be authenticated.

S7. If the certificates do not match, then the certificate presented to the client 3 is not valid and the servers 2 identity is not authenticated.

S8. The results of the authentication are sent back to the client 4.

In a further embodiment of the invention, it is possible that the authentication server 4 is targeted by a malicious third party using DNS cache poisoning or another attack. In this case, the authentication server 4 would also receive the fraudulent certificate. In order to address this, the authentication server 4 may maintain a query record 18 stored in the memory 16. The query record includes records of queries from all client nodes, including the certificates received from the server 2 (and other servers). In the event of a DNS poisoning attack, the certificate sent to the authentication server 4 from the client 3 will also match the certificate obtained from the server 2, even where the certificate is fraudulent. In order to reduce this risk, the authentication server 4 may perform a further check by comparing the certificate received from the client 3 with a certificate for the server 2 stored in the query record 18 from a previous query relating to that server. If the comparison indicates that the two certificates are different, then the authentication server 4 can perform a check to ascertain whether a DNS poisoning attack has occurred or whether the server 2 has started using a new certificate.

The check may be in the form of alerting a user to determine whether a DNS poisoning attack has occurred or whether the server 2 has started using a new certificate. Alternatively, the authentication server 4 takes no action and waits until a predetermined number of queries relating to the server 2 but from different clients has been received. If all of the subsequent queries use the same certificate as that presented by the server 4 to the client 3, it can be assumed that the server 2 is simply using the new certificate and the query record 18 and be updated.

The query record may be used to perform a statistical analysis, such that a check to ascertain whether a DNS poisoning attack has occurred or whether the server 2 has started using a new certificate occurs when a certain proportion of queries from clients use a different certificate to that stored in the query record.

Figure 4:
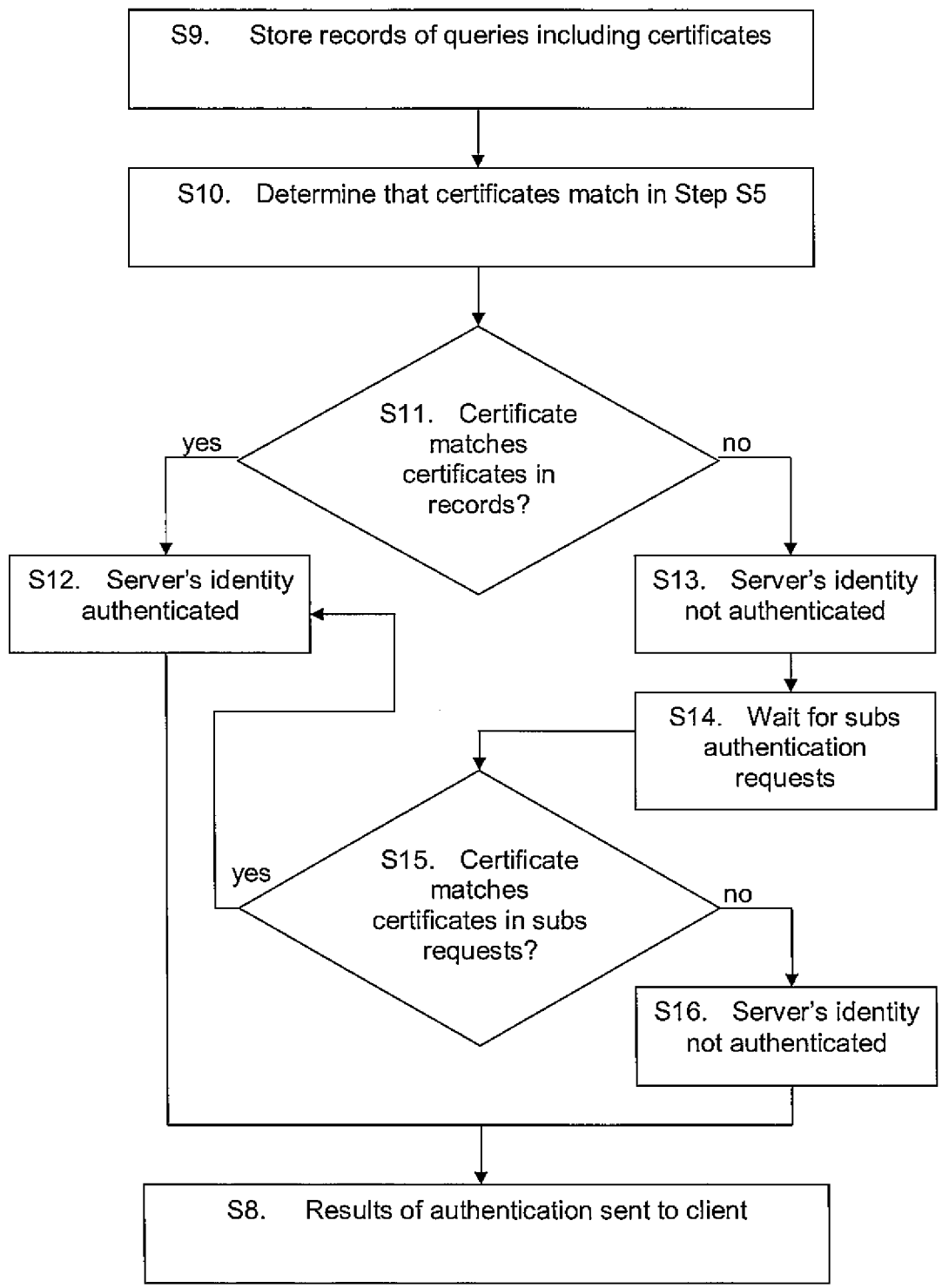
FIG. 4 is a flow diagram.

FIG. 4 is a flow diagram illustrating a further embodiment of the invention. The following numbering corresponds to that of FIG. 4:

S9. The authentication server 4 stores query records from a plurality of clients, the query including certificates purporting to come from the server 2.

S10. A determination is made that the certificate sent in the authentication request from the client 3 matches that received from the server 2, as described in step 55 above.

S11. A comparison is made between the certificate sent by the client 3 (this could equally be the certificate provided by the server 2) with certificates stored in the query records.

S12. If the certificate matches the certificates stored in the query records, or a predetermined proportion of the certificates stored in the query records, then the server's identity is authenticated, and the results of authentication are sent to the client as in step S8.

S13. If the certificate does not matches the certificates stored in the query records, or a predetermined proportion of the certificates stored in the query records, then the server's identity is not authenticated. The results of the authentication may be sent to the client as in step S8, or alternatively proceed to step S14

S14. The authentication server waits for a predetermined number of subsequent authentication requests from other clients.

S15. After receiving a predetermined number of subsequent authentication requests from other clients, a determination is made to see whether the certificate sent by the client 3 (or the one provided by the server 2) matches a sufficient proportion of certificates in the subsequent requests. If so, then the server's identity is authenticated and the method proceeds to step S12. If not, then the method proceeds to step S16.

S16. The server's identity is not authenticated.

S8. The results of the authentication are sent from the authentication server 4 to the client 2.

Figure 5:
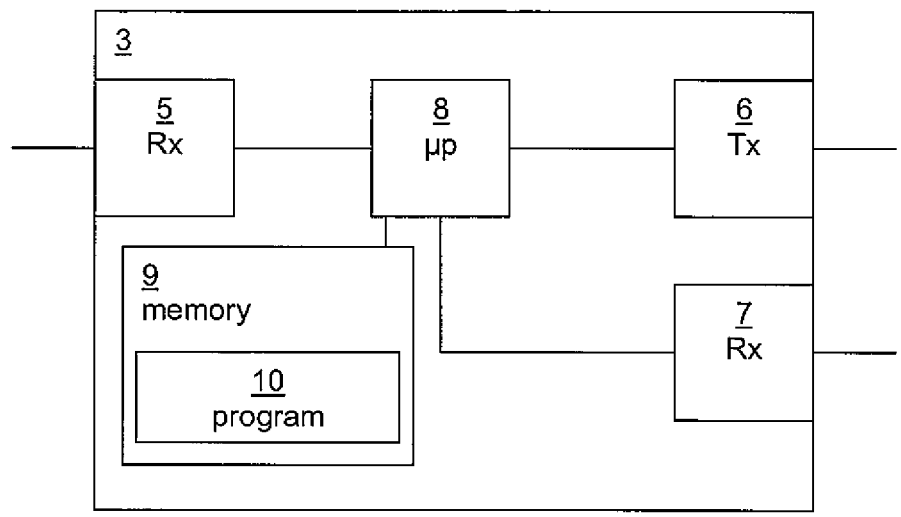
FIG. 5 illustrates schematically in a block diagram a client node.

Turning now to FIG. 5, a client node 3 is illustrated. The client node 3 is provided with a first receiver 5 for receiving a certificate from a node purporting to be the server 2. A first transmitter 6 is provided for sending an authentication request to the authentication server 4. A second receiver 7 is provided for receiving the results of the authentication check from the authentication server 4. A processor 8 controls the signalling and is arranged to terminate communication with the node purporting to be the server 2 in the event that the authentication result indicates that the certificate is not associated with the server 2. A memory 9 is also provided in the form of a computer readable medium, on which a program 10 may be stored. The program 10, when executed by the processor 8, causes the client node 3 to behave as described above.

Figure 6:
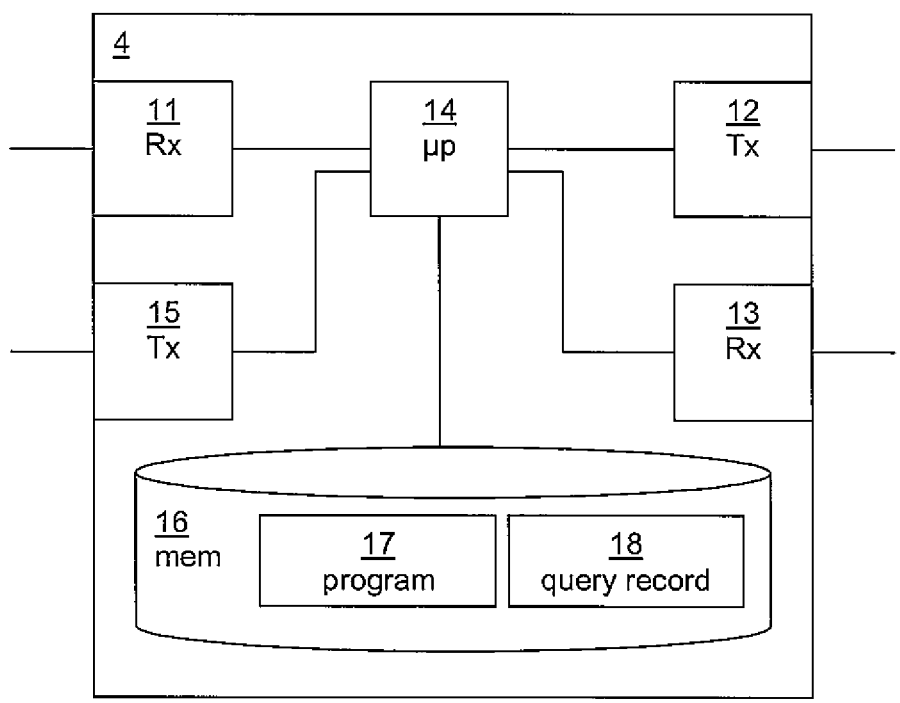
FIG. 6 illustrates schematically in a block diagram an authentication server.

An authentication server 4 is shown in FIG. 6. The authentication server 4 is provided with a first receiver 11 for receiving an authentication request from the client 3. The authentication request includes a first certificate purporting to be from the server 2. A first transmitter 12 is arranged to sending a request message to the server 2. A second receiver 13 is provided for receiving a response from the server 2, the response including the server's 2 certificate. A processor 14 is provided for comparing the received certificates. If the certificates match, the certificate presented to the client 3 can be authenticated, and if the certificates do not match, the certificate presented to the client 3 cannot be authenticated. A second transmitter 15 is provided for sending the result of the comparison to the client 3. The authentication node 4 may also have a memory 16 for storing information associated with the certificates. The memory 16 is in the form of a computer readable medium on which a program 17 may be stored. The program 17, when executed by the processor 14, causes the authentication server 4 to behave as described above.

Problems can arise when a malicious third party is able to create server certificates that are issued by a root CA or its delegate CA. For example, the malicious third party may perform a man-in-the-middle attack between many endpoints and the CA, or a central server containing information regarding certificates.

In order to address this, a local certificate reputation system (LCRS) can be implemented on a client node, which is not dependent on the availability of a central server, such as the CA or the authentication server 6. The LCRS stores data relating to certificates in a database, such as what type of certificates belong to which servers and which CA's issued them, how these certificates change over time or location, and over what type of network the certificates were obtained (WiFi, 3G, 4G, LTE and other mobile broadband networks, for example). In this way, data is built up over time based on the certificates received at the client node.

The LCRS can synchronise occasionally with a central server if one is available. When synchronised, the LCRS can download certificate revocation lists, or can download additional information regarding certificates that have been gathered from other client nodes. Furthermore, when synchronised, the LCRS can also upload data relating to certificates stored at the client node to the central server. The LCRS can also download, or create a reputation list, which details the reputation of CAs and central servers. The reputation list can be consulted to determine how trusted a CA or central server is.

When the client node receives a certificate from a node, such as a server, the LCRS generates a reputation score for the certificate based on the information stored in the database. The reputation score may be defined numerically, such as a value selected from 0 to 10, with 0 being untrustwory, and 10 being very trustworthy, for example. As an example, the following methods may be used by the LCRS to determine a reputation score:

If the certificate is on a CA revocation list, it is likely that the certificate is untrustworthy, and the LCRS can assign a low reputation score to the certificate.

If the certificate is issued by a questionable root CA (e.g. a root CA has issued false certificates in the past, or its security has possibly been compromised, parameters that can be derived from history information or configured by the system administrator can be used to determine that the risk value is higher, and the reputation score is lowered. The reputation of a CA or central server may be stored at the client node in a reputation list. If a server's certificate was given a low reputation score in the past, this may have an effect on determining the reputation score of a new certificate issued by the same server.

If the certificate relates to a server that currently already has an existing certificate, the risk value is increased. The risk value may be further increased if the existing certificate will remain valid for a long period of time, as it is suspicious that a new certificate has been issued when an existing certificate has a long remaining life. This is especially suspicious if the old certificate is not in a revocation list.

If the certificate received from the remote node is from a first CA, and previous certificates received from the remote node were from a second CA, then the certificate is possibly less trustworthy and the LCRS can assign a low reputation score.

If the certificate from a given server varies depending on what network is used to connect to it, this may be seen as suspicious. An attacker is unlikely to be able to control every possible network. For example, an attacker may have control over a local ISP and thus have control over a network connection using WiFi, but the attacker may not have control over a mobile broadband network connection, such as a 3G network connection, at the same time. Therefore the LCRS can check which certificate is issued over several different network connections, and determine if the server is offering a different certificate depending on which network interface is being used. This can also be checked passively, simply by keeping a record of all certificates seen by the local certificate reputation server when a client naturally moves from one network to another. If it is determined that a new certificate is issued from a server using one network, but an older or different certificate is issued using another network, it is likely that the certificate is untrustworthy, and a lower reputation score may be applied.

If the certificate relating to a server differs from previous certificates presented from the server to the client, or other clients, during a defined period and/or at a defined location, the risk is higher and the reputation score is lowered.

Once the LCRS has generated the reputation score, the client node, or the user using the client node, may use the reputation score, and any other information, to make a determination as to whether or not to trust the certificate.

Figure 7:
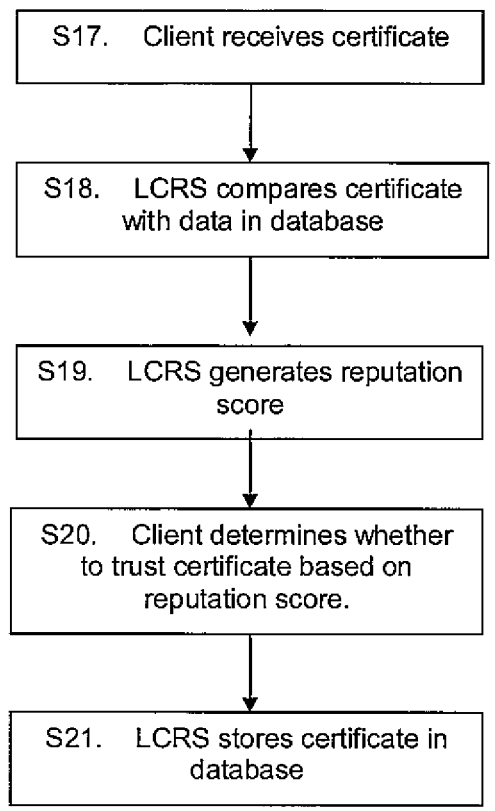
FIG. 7 is a flow diagram showing the steps of an embodiment of the invention.

FIG. 7 is a flow diagram illustrating steps of the invention. The following numbering corresponds to the numbering of FIG. 7:

S17. A client node receives a certificate from a node, such as a server.

S18. An LCRS, implemented at the client node, compares information relating to the certificate with data in a database.

S19. The LCRS generates a reputation score for the certificate, based on data available in the database.

S20. The client node, or user using the client node, uses the reputation score to make a determination as to whether or not to trust the certificate. In the event that the client node or user does not trust the certificate, communication with the node may be terminated. This may be done automatically.

S21. The LCRS stores the certificate in the database, along with any other information relating to the certificate, such as the time it was received/generated, address of the node, network details regarding the connection to the node, etc. The LCRS may also store the generated reputation score relating to the certificate, along with any subsequent action that the client node or user performed such as noting that the client node or user decided not to trust the certificate.

The LCRS is able to estimate a certificate's reputation based on information provided solely by the client node.

However, this estimation can be improved by synchronising with a CA or central server and updating information in the database relating to certificates. Information downloaded from the central server may be based on results sent to the central server by further client nodes. The LCRS can also upload information to the central server. This information may relate to certificates received by the client node, including the certificates themselves. Alternatively, the LCRS may synchronise with another node, such as another client node, such that the nodes may exchange certificate information and reputation scores.

Advantageously, by building up a database of empirical data relating to the certificates, a client node will be able to make an informed decision as to whether to trust a certificate without having to connect to a central server.

Figure 8:
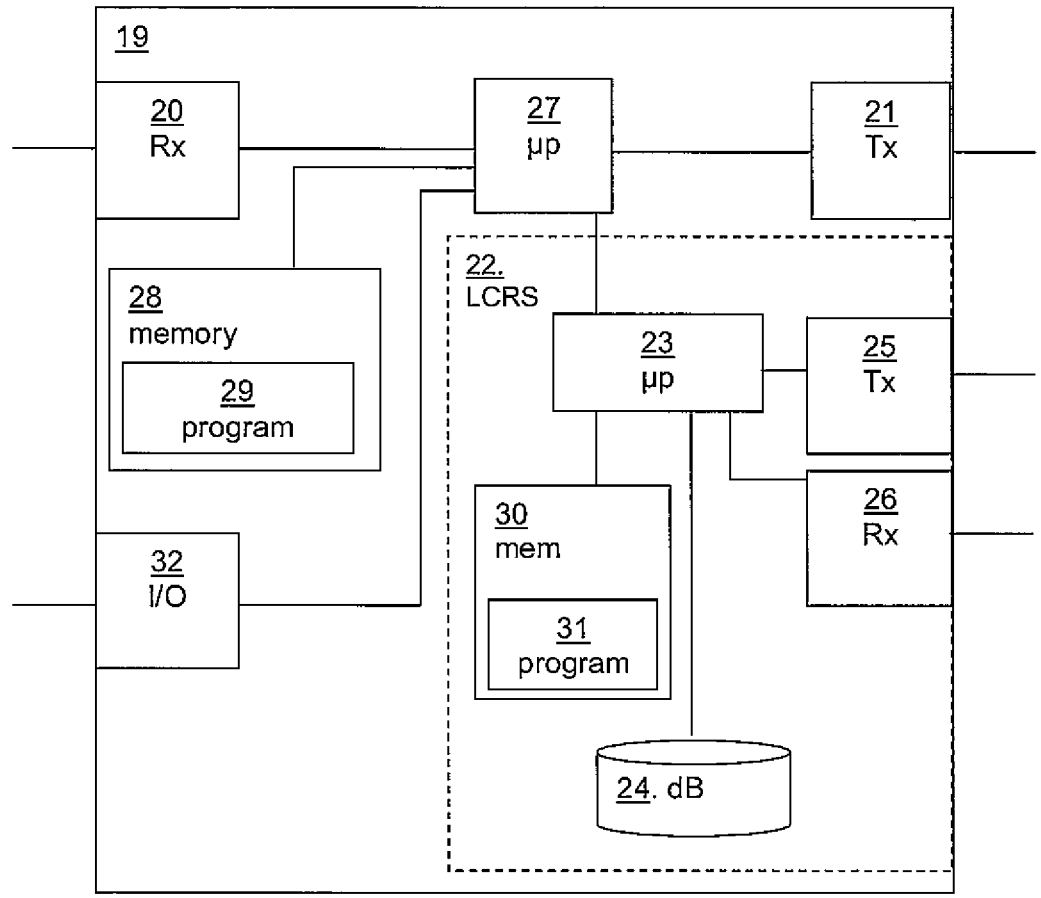
FIG. 8 illustrates schematically in a block diagram a client node according to an embodiment of the invention.

Turning now to FIG. 8, a client node 19 is illustrated. The client node 19 is provided with a first receiver 20 for receiving a certificate from a node and a first transmitter 21 for communicating with the node. An LCRS 22 is provided for generating a reputation score for the certificate. The LCRS 22 comprises a first processor 23 which compares the received certificate with data in a database 24 relating to certificates. The LCRS 22 can use a second transmitter 25 to send a request for information relating to certificates to a central server, such as a CA, if one is available. This information is received via a second receiver 26, and stored in the database 24. When the first processor 23 has generated a reputation score for the certificate, the first processor 23 communicates this to a second processor 27. The second processor 27 can then make a decision as to whether it trusts the certificate, and terminate communication with the node accordingly. Alternatively, the second processor 27 can prompt the user to make the decision via an I/O interface 32. Note that the function performed by the first and second processors may be performed by the same physical processor.

A first memory 28 is also provided in the form of a computer readable medium, on which a program 29 may be stored. The program 29, when executed by the second processor 27, causes the client node 19 to behave as described above. A second memory 30 is also provided in the form of a non-transitory computer readable medium, on which a second program 31 may be stored. The second program 31, when executed by the first processor 23, causes the LCRS to behave as described above.

By building up data relating to certificates, a historical record is kept locally of what servers are using what certificates. Advantageously, the LCRS does not rely on access to a central server, and so even if a path to a central server is compromised, the client node will be able to determine whether to trust a given certificate.

The same system can be used for other types of certificates, such as e-mail and software signing certificates. While the LCRS has been described as being implemented at the client node 19, it may also be implemented in a router, serving a group of client nodes (for example, a home router serving two home PCs/laptops/tablets).

It will be appreciated by the person of skill in the art that various modifications may be made to the above described embodiment without departing from the scope of the present invention. For example, whilst the above description refers to a client node attempting to authenticate a servers certificate, it will be appreciated that the method can be applied to any types of node in a communications network.

The invention claimed is:

1. A method of determining a reputation score for a digital certificate offered by a remote computer node in a computer communication network, the method comprising:
at a client computer node in the computer communication network,
receiving from the remote computer node the digital certificate, via a network interface to which the client is connected;
comparing data relating to the received certificate with further data stored in a certificates database stored at the client node, that further data comprising data relating to one or more certificates offered by said remote node via one or more different network interfaces, wherein the comparing comprises comparing data identifying the network interface(s) via which each of the certificates is offered; and
determining a reputation score for the received certificate based on the comparison, and determining whether to trust the received certificate using the reputation score.

2. The method of claim 1, further comprising the step of determining whether to terminate communication with the remote node based on the reputation score.

3. The method of claim 1, further comprising the step of informing a user of the reputation score, such that the user can decide whether to terminate communication with the remote node.

4. The method of claim 1, further comprising storing data related to the certificate in the database, along with data identifying a network type over which the received certificate was received.

5. The method of claim 4, further comprising storing further information about the received certificate, wherein the further information comprises any one of:
a date and/or time the received certificate was generated;
a date and/or time the received certificate was received;
an address of the remote node.

6. The method of claim 1, wherein the comparison to determine the reputation score comprises any of:
comparing the received certificate against information contained in a Certifying Authority revocation list;
comparing a reputation of the remote node against information contained in a reputation list;
determining if the remote node already has an existing certificate, and comparing the existing certificate with the received certificate; and
comparing the certificate received from the remote node against further certificates received from the remote node at different time periods or locations.

7. The method of claim 1, wherein the network may be any one of a WiFi, 3G, or LTE network.

8. The method of claim 1, the method comprising:
downloading information relating to certificates from a server; and
storing the information relating to certificates in the database.

9. The method of claim 8, further comprising uploading information relating to the certificates to the server.

10. A client computer node, the client computer node comprising:
a first receiver arranged to receive a digital certificate from a remote node via a computer network interface;
a certificates database comprising data relating to certificates, that data comprising data relating to one or more certificates offered by said remote node via one or more different network interfaces, including data identifying the network interface(s) via which each of the certificates is offered;

a first processor arranged to compare data relating to the received certificate with the data in the certificates database, including compare of the data identifying the network interface(s) via which each of the certificates is offered;

the first processor further arranged to determine a reputation score for the received certificate based on the comparison, and to use the reputation score to determine whether to trust the received certificates.

11. The client node of claim 10, the client node further comprising a second processor arranged to determine whether to terminate the communication with the remote node based on the reputation score.

12. The client node of claim 10, the client node further comprising an I/O interface, and comprising a second processor arranged to inform a user of the reputation score, such that the user can decide whether to terminate the communication with the remote node.

13. The client node of claim 10, wherein the first processor is arranged to store data relating to the received certificate in the database, along with data identifying a network type over which the received certificate was received.

14. The client node of claim 10, wherein the first processor is arranged to compare any of:

The certificate received from the remote node with information contained in a Certifying Authority revocation list;

a reputation of the remote node against a reputation list stored in the database;

an existing certificate for the remote node against the received certificate from the remote node; and the certificate received from the remote node against further certificates received from the remote node at different time periods or locations.

15. The client node of claim 10, further comprising:

a transmitter for transmitting a request to a server for further information regarding certificates; and a second receiver for receiving the further information regarding certificates.

16. A computer program product comprising a non-transitory computer readable medium and a computer program comprising computer readable code which, when run on a client node, causes the client node to behave as a client node as claimed in claim 10, wherein the computer program is stored on the non-transitory computer readable medium.

* * * * *